(12) United States Patent
Hwang et al.

(10) Patent No.: US 8,537,308 B2
(45) Date of Patent: Sep. 17, 2013

(54) METHOD OF FORMING POLYMER-DISPERSED LIQUID CRYSTAL FILM INCLUDING DICHROIC DYE

(75) Inventors: Kyu-young Hwang, Seoul (KR); Jae-eun Jang, Seoul (KR); Gae-hwang Lee, Hwaseong-si (KR); Jae-eun Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 266 days.

(21) Appl. No.: 13/064,136

(22) Filed: Mar. 8, 2011

(65) Prior Publication Data

US 2012/0088320 A1 Apr. 12, 2012

(30) Foreign Application Priority Data

Oct. 8, 2010 (KR) .............................. 2010-0098342

(51) Int. Cl.
*G02F 1/1333* (2006.01)
*G02F 1/13* (2006.01)

(52) U.S. Cl.
USPC ................................ 349/92; 349/88; 349/187

(58) Field of Classification Search
USPC .............................................. 349/86, 92, 187
See application file for complete search history.

(56) References Cited

U.S. PATENT DOCUMENTS 7,649,595 B2 * 1/2010 Masutani et al. ............... 349/89

FOREIGN PATENT DOCUMENTS

| JP | 0895009 A | 4/1996 |
| KR | 100806972 A | 2/2008 |
| KR | 20080053625 A | 6/2008 |

* cited by examiner

*Primary Examiner* — Nathanael R Briggs
(74) *Attorney, Agent, or Firm* — Harness, Dickey & Pierce, P.L.C.

(57) ABSTRACT

In a method of forming a polymer-dispersed liquid crystal (PDLC) film, the presence of dichroic dye in a polymer may be prevented or reduced by diffusing dichroic dye into a PDLC layer, and a PDLC display device having improved visibility may be formed.

20 Claims, 8 Drawing Sheets

METHOD OF FORMING POLYMER-DISPERSED LIQUID CRYSTAL FILM INCLUDING DICHROIC DYE

CROSS-REFERENCE TO RELATED APPLICATIONS

This application claims the benefit of Korean Patent Application No. 10-2010-0098342, filed on Oct. 8, 2010, in the Korean Intellectual Property Office, the entire contents of which are incorporated herein by reference.

BACKGROUND

1. Field

Example embodiments relate to methods of forming a polymer-dispersed liquid crystal film, and more particularly, to methods of forming a polymer-dispersed liquid crystal film including dichroic dye.

2. Description of the Related Art

Polymer-dispersed liquid crystal (PDLC) display devices are devices in which light is scattered or transmitted by applying an electric field to the PDLC. The electric field allows for a change in the refractive indexes of a polymer and a liquid crystal uniformly mixed in a PDLC. In PDLC display devices, light is allowed to pass or is blocked by using only an electric field and not an orientation film or a polarizing plate. Also, a contrast of a display device may be improved by mixing a PDLC and dichroic dye. Generally, when dichroic dye is mixed with a liquid crystal, dichroic dye is inclined to be aligned in the same orientation as the liquid crystal. Thus, when dichroic dye is mixed with a PDLC, dichroic dye may be aligned or randomly distributed according to an orientation of liquid crystal included in the PDLC, thereby causing an optical change.

Conventionally, a PDLC film including dichroic dye is formed by injecting a mixed solution including a liquid crystal, a photo-polymerizable material, and dichroic dye between two substrates and exposing the mixed solution to ultraviolet (UV) rays, thereby curing the mixed solution. In this regard, the photo-polymerizable material refers to a material that is polymerized by photo-polymerization, and may be a monomer or an oligomer. Through the UV curing process, the liquid crystal is uniformly dispersed in the polymer, and dichroic dye may be uniformly present in the polymer and the liquid crystal. However, in a display device including a PDLC film formed by the method described above, dichroic dye present in the polymer may adversely affect optical characteristics of the display device. That is, dichroic dye present in the polymer may be immobilized by the UV curing process and the immobilized dichroic dye does not have an optical anisotropy. Thus, the dichroic dye adversely affects visibility of the display device. In addition, during the UV curing process, dichroic dye present in the polymer may continuously absorb UV rays to degrade UV curing characteristics.

SUMMARY

Example embodiments provide methods of forming a polymer-dispersed liquid crystal film including dichroic dye. Additional aspects will be set forth in part in the description which follows and, in part, will be apparent from the description, or may be learned by practice of example embodiments.

According to example embodiments, a method of forming a polymer-dispersed liquid crystal (PDLC) film includes forming a PDLC layer on a first substrate, the PDLC layer including a liquid crystal and a polymer, coating a mixed solution on an upper surface of the PDLC layer, the mixed solution including a liquid crystal and dichroic dye, diffusing the liquid crystal and dichroic dye of the mixed solution into the PDLC layer such that the PDLC layer includes the dichroic dye and attaching a second substrate to the upper surface of the PDLC layer including the dichroic dye.

The forming the PDLC layer on the first substrate may include injecting a solution between the first substrate and a third substrate spaced apart from the first substrate, the solution including the liquid crystal and a photo-polymerizable material, irradiating ultraviolet (UV) rays to the solution and separating the third substrate from an upper surface of the PDLC layer. The third substrate may include a releasing material that enables the third substrate to be separated from the PDLC layer.

The forming the PDLC layer on the first substrate may include placing a solution on the first substrate, the solution including the liquid crystal and a photo-polymerizable material and irradiating UV rays to the solution under an inert gas atmosphere to form the PDLC layer. The coating the mixed solution on the upper surface of the PDLC layer may include a process selected from the group consisting of spraying, dipping and roll coating processes. The diffusing the liquid crystal and dichroic dye of the mixed solution into the PDLC layer may include increasing the temperature of the first substrate. Each of the first and second substrates may include at least one of a TFT and a color filter.

According to example embodiments, a method of forming a polymer-dispersed liquid crystal (PDLC) film may include forming a PDLC layer on a first substrate, the PDLC layer including a liquid crystal and a polymer, coating a mixed solution on an upper surface of the PDLC layer, the mixed solution including a liquid crystal, a photo-polymerizable material, and dichroic dye, diffusing the liquid crystal, the photo-polymerizable material, and dichroic dye of the mixed solution into the PDLC layer such that the PDLC layer includes the dichroic dye and attaching a second substrate to an upper surface of the PDLC layer including the dichroic dye and irradiating ultraviolet (UV) rays thereto.

According to example embodiments, a method of forming a polymer-dispersed liquid crystal (PDLC) film by using a roll-to-roll process includes coating a solution on a first substrate using a first roller, the solution including a liquid crystal and a photo-polymerizable material, placing a third substrate on an upper surface of the solution using a second roller, irradiating UV rays to the solution to form a PDLC layer, the PDLC layer including the liquid crystal and a polymer, separating the third substrate from an upper surface of the PDLC layer using a third roller, coating a mixed solution on the upper surface of the PDLC layer, the mixed solution including a liquid crystal and dichroic dye, diffusing the liquid crystal and the dichroic dye of the mixed solution into the PDLC layer such that the PDLC layer includes the dichroic dye and attaching a second substrate to the upper surface of the PDLC layer including the dichroic dye.

According to example embodiments, a method of forming a polymer-dispersed liquid crystal (PDLC) film by using a roll-to-roll process includes coating a solution on a first substrate using a roller, the solution including a liquid crystal and a photo-polymerizable material, forming a PDLC layer by irradiating ultraviolet (UV) rays to the solution under an inert gas atmosphere, the PDLC layer including liquid crystal and a polymer, placing a mixed solution on an upper surface of the PDLC layer, the mixed solution including a liquid crystal and dichroic dye, diffusing the liquid crystal and the dichroic dye of the mixed solution into the PDLC layer such that the PDLC layer includes the dichroic dye, and attaching a second substrate to the upper surface of the PDLC layer including the dichroic dye.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
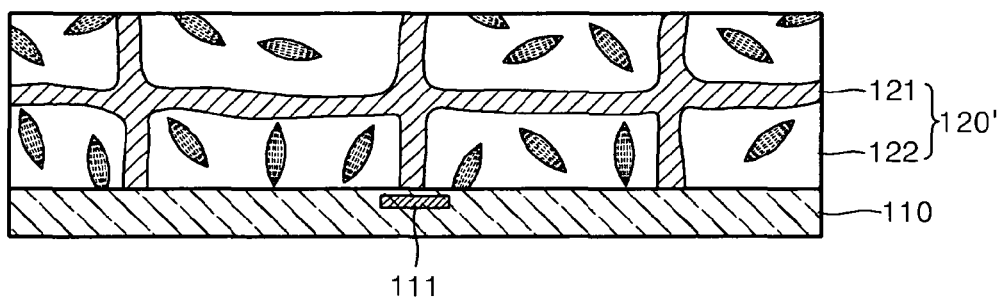
FIGS. 1 through 9 are views for explaining a method of forming a polymer-dispersed liquid crystal film including dichroic dye, according to example embodiments.

Reference will now be made in detail to example embodiments, examples of which are illustrated in the accompanying drawings, wherein like reference numerals refer to like elements throughout and the size or thickness of each element may be enlarged for clarity. In this regard, example embodiments may have different forms and should not be construed as being limited to the descriptions set forth herein. Accordingly, example embodiments are merely described below, by referring to the figures, to explain the present description.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIGS. 1 through 9 are views for explaining a method of forming a polymer-dispersed liquid crystal (PDLC) film including dichroic dye, according to example embodiments. Referring to FIG. 1, a PDLC layer 120' is formed on a first substrate 110. In this regard, a polymer 121 is formed in a network form in the PDLC layer 120', and a liquid crystal 122 is dispersed in the polymer. The first substrate 110 may be a transparent substrate, such as a glass substrate, or a flexible substrate, for example. Also, although not illustrated in FIG. 1, the first substrate 110 may further include at least one first component 111 selected from a thin film transistor (TFT) and a color filter.

Figure 5:
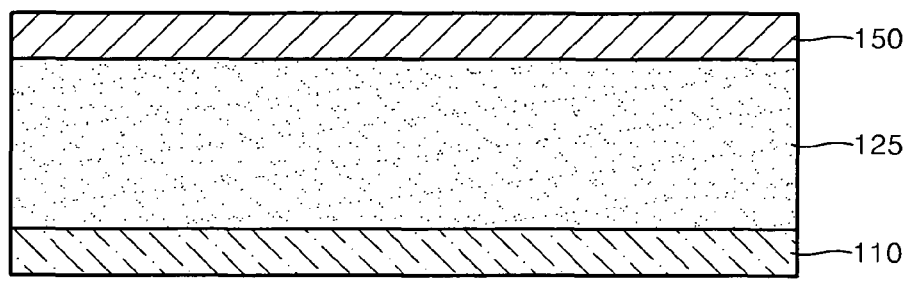
Figure 6:
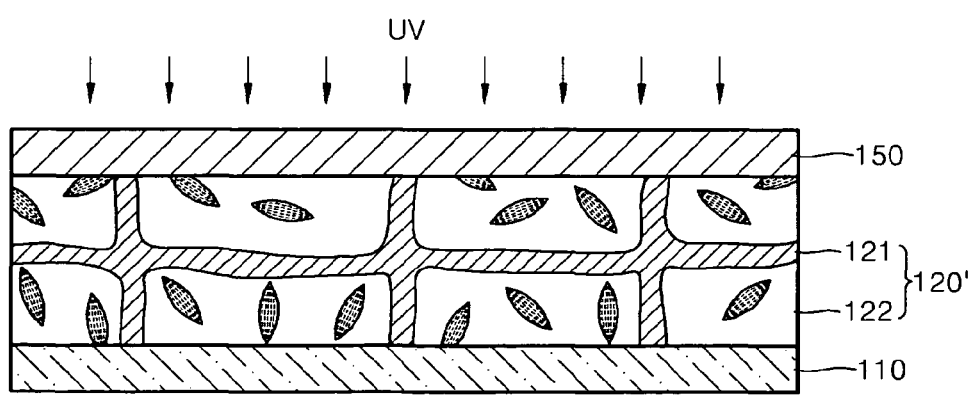
Figure 7:
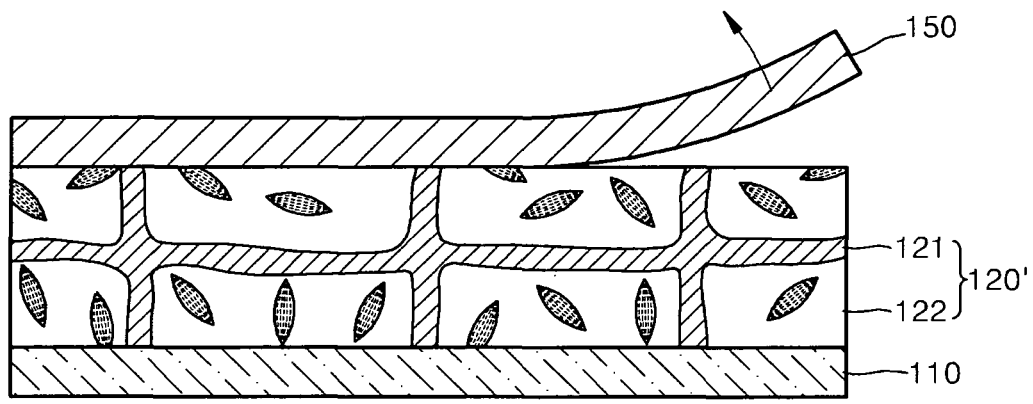

A method of forming the PDLC layer 120' on the first substrate 110 will now be described in detail. FIGS. 5 through 7 are views for explaining an example of the method of forming the PDLC layer 120' on the first substrate 110. Referring to FIG. 5, a third substrate 150 is disposed spaced apart from the first substrate 110. In this regard, the third substrate 150 may be a transparent substrate. Subsequently, a solution 125 including a liquid crystal and a photo-polymerizable material is injected between the first substrate 110 and the third substrate 150. In this regard, the photo-polymerizable material refers to a material that is cured and polymerized by photo-polymerization. The photo-polymerizable material may include at least one of a monomer and an oligomer.

Referring to FIG. 6, ultraviolet (UV) rays are irradiated to the solution 125 through the third substrate 150. Through the UV irradiation process, the photo-polymerizable material in the solution 125 is cured to form the polymer 121, thereby forming the PDLC layer 120' including the liquid crystal 122 and the polymer 121 between the first substrate 110 and the third substrate 150. In the PDLC layer 120', the polymer 121 is formed in a network form, and the liquid crystal 122 is uniformly dispersed in the polymer 121. Referring to FIG. 7, the third substrate 150 is separated from an upper surface of the PDLC layer 120'. The third substrate 150 may be formed of a releasing material that enables the third substrate 150 to be easily separated from the PDLC layer 120'.

Figure 8:
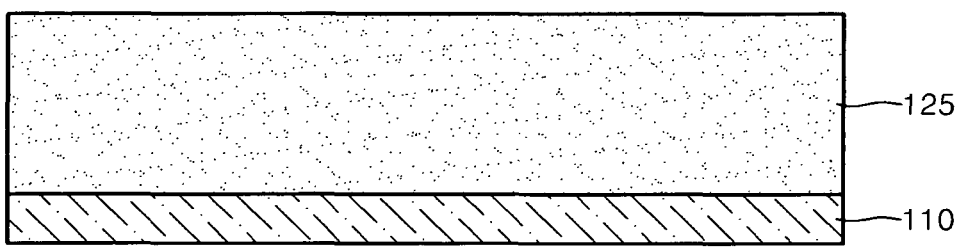
Figure 9:
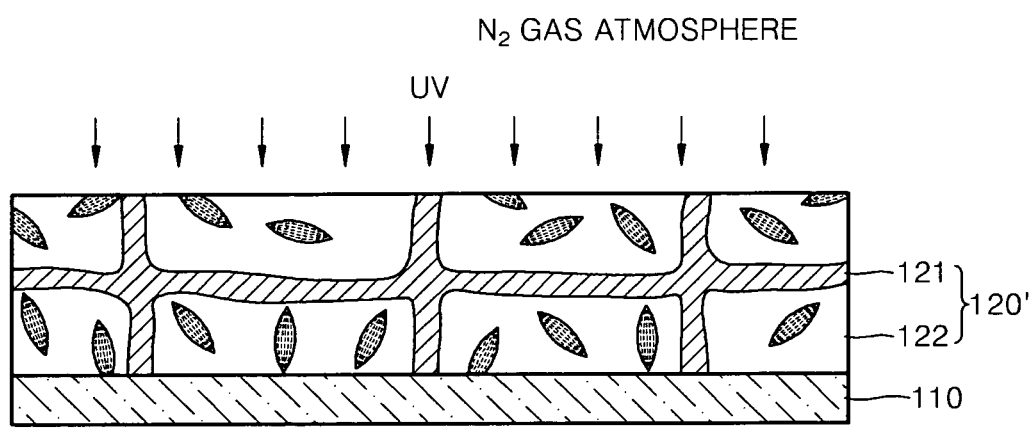

FIGS. 8 and 9 are views for explaining another example of the method of forming the PDLC layer 120' on the first substrate 110. Referring to FIG. 8, a solution 125 including a liquid crystal and a photo-polymerizable material is coated on the first substrate 110. Referring to FIG. 9, UV rays are irradiated to the solution 125, including the liquid crystal and the photo-polymerizable material, coated on the first substrate 110. In this regard, the UV irradiation process may be performed under an inert gas atmosphere. The inert gas may be, for example, a nitrogen gas or a helium gas, but is not limited thereto. Through the UV irradiation process, the photo-polymerizable material in the solution 125 is cured to form the polymer 121, thereby forming the PDLC layer 120', including the liquid crystal 122 and the polymer 121, on the first substrate 110. In the PDLC layer 120', the polymer 121 is formed in a network form, and the liquid crystal 122 is uniformly dispersed in the polymer 121.

Figure 2:
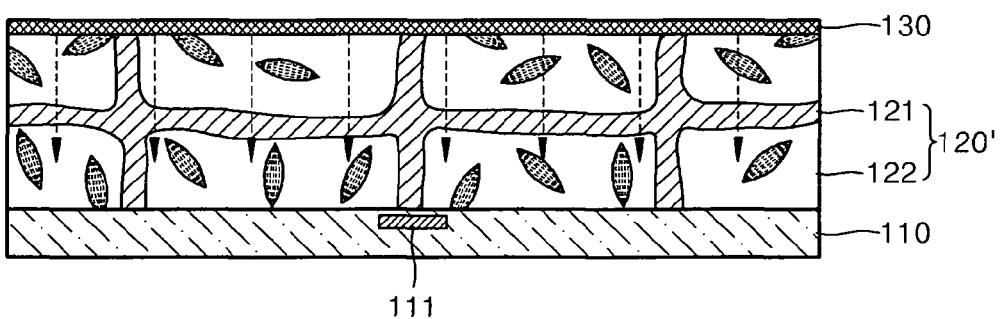

Subsequently, referring to FIG. 2, a mixed solution 130, including a liquid crystal and dichroic dye is coated on the upper surface of the PDLC layer 120' formed on the first substrate 110. When mixed with a liquid crystal, dichroic dye has the same orientation as the liquid crystal. The dichroic dye may be, for example, black, red, green, blue, yellow, magenta, or cyan, and may also be of other colors. The coating of the mixed solution 130 may be performed by, for example, spraying using an inkjet ejecting device, dipping, or roll coating. However, the coating method is not limited thereto and various other coating methods may also be used to coat the mixed solution 130 on the upper surface of the PDLC layer 120'. A given time after the mixed solution 130 including the liquid crystal and dichroic dye is coated on the upper surface of the PDLC layer 120', the liquid crystal and dichroic dye of the mixed solution 130 diffuse into the PDLC layer 120'. In FIG. 2, the diffusion directions of the liquid crystal and dichroic dye of the mixed solution 130 into the PDLC layer 120' are indicated by dash arrows. In addition, if the first substrate 110 is heated in this process, the liquid crystal and dichroic dye may diffuse more rapidly.

Figure 3:
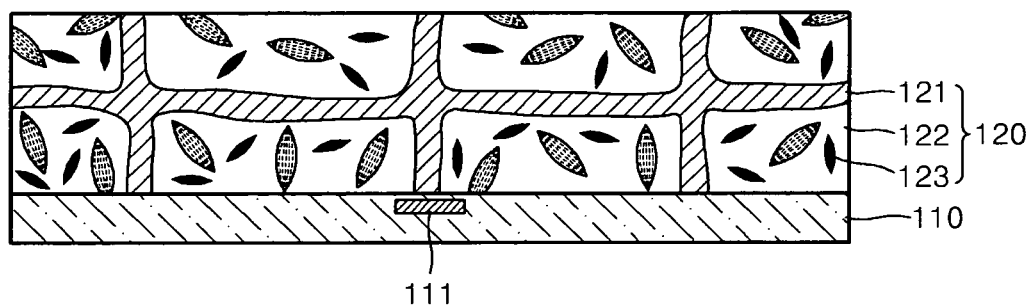

When the diffusion process is finished, as illustrated in FIG. 3, a PDLC layer 120 including a dichroic dye 123 is formed on the first substrate 110. In the PDLC layer 120, the liquid crystal 122, the dichroic dye 123, and the polymer 121 are uniformly dispersed. Due to the diffusion, the dichroic dye 123 is present only in the liquid crystal 122 in the PDLC layer 120. In other words, the dichroic dye 123 is not present in the network-shaped polymer 121.

Figure 4:
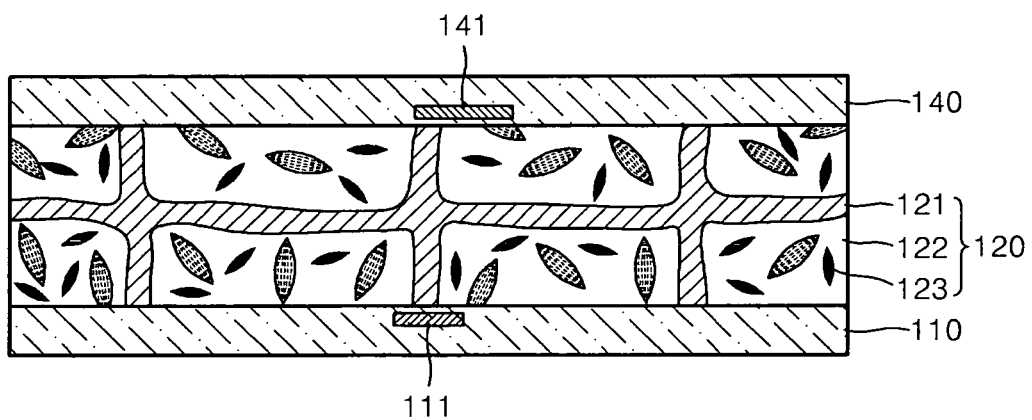

Referring to FIG. 4, a second substrate 140 is placed on an upper surface of the PDLC layer 120 including the dichroic dye 123. In this regard, like the first substrate 110, the second substrate 140 may be a transparent substrate, such as a glass substrate, or a flexible substrate, for example. Also, the second substrate 140 may further include a second component 141 selected from a TFT and a color filter. A substrate including at least one of a TFT and a color filter has a lower aperture ratio, and thus, may degrade UV curing characteristics. Thus, a substrate including at least one of a TFT and a color filter may not be used as a substrate through which UV rays are transmitted during the UV curing process. In example embodiments, when a display device including the PDLC layer 120 including the dichroic dye 123 is manufactured, a substrate including a TFT may be used as the first substrate 110 and a substrate including a color filter may be used as the second substrate 140. Alternatively, a substrate including a TFT may be used as the second substrate 140 and a substrate including a color filter may be used as the first substrate 110.

As described above, by diffusing the dichroic dye 123 into the PDLC layer 120' including the liquid crystal 122 and the polymer 121, the PDLC layer 120 in which the dichroic dye 123 is present only in the liquid crystal 122 is formed. By doing so, visibility and UV curing characteristics of a display device including the PDLC layer 120 may be improved.

Figure 10:
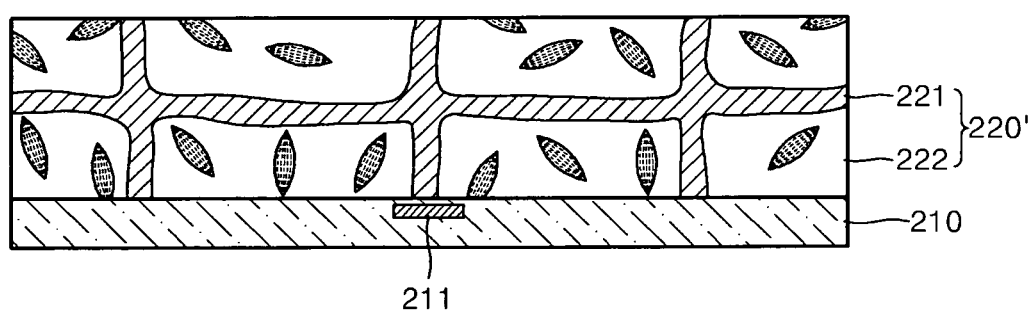
FIGS. 10 through 12 are views for explaining a method of forming a polymer-dispersed liquid crystal film including dichroic dye, according to example embodiments.
Figure 11:
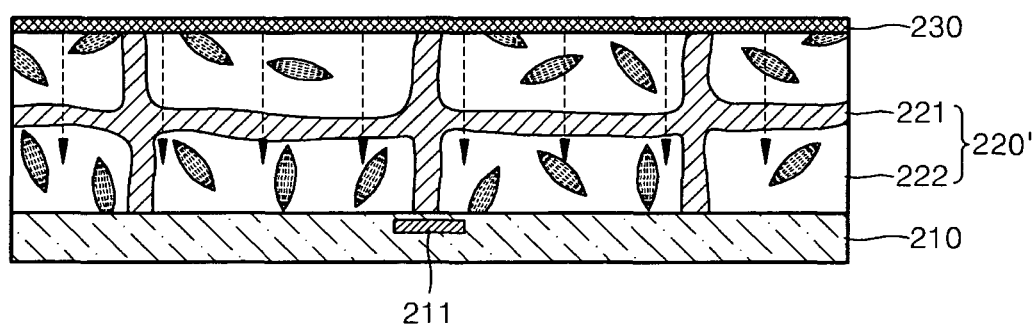
Figure 12:
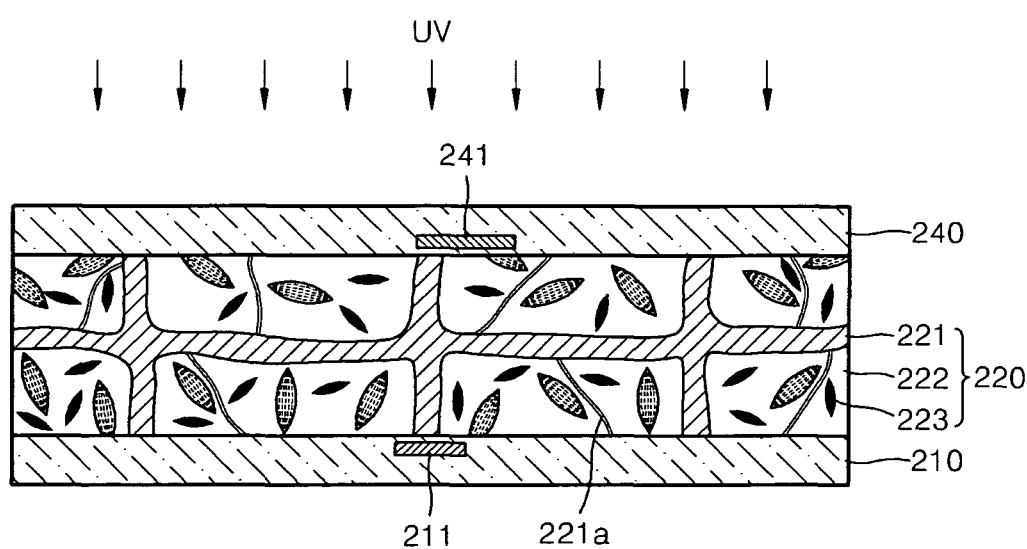

FIGS. 10 through 12 are views for explaining a method of forming a PDLC film including a dichroic dye 223, according to example embodiments. Hereinafter, a difference between the method according to the example embodiment illustrated in FIGS. 10 through 12 and the method according to the example embodiment illustrated in FIGS. 8 and 9 will be described in detail.

Referring to FIG. 10, a PDLC layer 220' is formed on a first substrate 210. The first substrate 210 may be a glass substrate or a flexible substrate, and may further include a first component 211 selected from a TFT and a color filter. In this regard, in the PDLC layer 220', a first polymer 221 is present in a network form and a liquid crystal 222 is uniformly dispersed in the first polymer 221. The PDLC layer 220' may be formed on the first substrate 210 by using the method described with reference to FIGS. 5 through 7 or the method described with reference to FIGS. 8 and 9. The methods will not be described herein.

Referring to FIG. 11, a mixed solution 230 including a liquid crystal, dichroic dye, and a photo-polymerizable material is coated on an upper surface of the PDLC layer 220'. In this regard, the photo-polymerizable material refers to a material that is cured and polymerized by photo-polymerization. The photo-polymerizable material may include at least one material of a monomer and an oligomer. The coating of the mixed solution 230 may be performed by, for example, spraying using an inkjet ejecting device, dipping, or roll coating. However, the coating method is not limited thereto and various other coating methods may also be used to coat the mixed solution 230 on the upper surface of the PDLC layer 220'.

A given time after the mixed solution 230, including the liquid crystal, dichroic dye, and the photo-polymerizable material, is coated on the upper surface of the PDLC layer 220', the liquid crystal, dichroic dye, and the photo-polymerizable material of the mixed solution 230 diffuse into the PDLC layer 220'. In FIG. 11, the diffusion directions of the liquid crystal, dichroic dye, and the photo-polymerizable material of the mixed solution 230 into the PDLC layer 220' are indicated by dash arrows. Due to the diffusion process, the dichroic dye 223 is present in the liquid crystal 222. Also, if the first substrate 210 is heated in this process, the liquid crystal, dichroic dye, and the photo-polymerizable material may diffuse more rapidly.

Referring to FIG. 12, when the diffusion of the liquid crystal, dichroic dye, and the photo-polymerizable material is finished, a PDLC layer 220 including the dichroic dye 223 is formed. In this regard; due to the diffusion, the dichroic dye 223 is present only in the liquid crystal 222, and is not present in the first polymer 221. Subsequently, a second substrate 240 is placed on an upper surface of the PDLC layer 220 including the dichroic dye 223, and UV rays are irradiated thereto. In this regard, like the first substrate 210, the second substrate 240 may be a transparent substrate, such as a glass substrate, or a flexible substrate, for example. Also, the second substrate 240 may further include a second component 241 selected from a TFT and a color filter. Since the photo-polymerizable material present in the PDLC layer 220 contacting the second substrate 240 is cured in the UV irradiation process, the second substrate 240 may be more strongly attached to the upper surface of the PDLC layer 220. In addition, since the photo-polymerizable material present in the PDLC layer 220 including the dichroic dye 223 is cured in the UV irradiation process, a second polymer 221a may be additionally formed in a network form.

Figure 13:
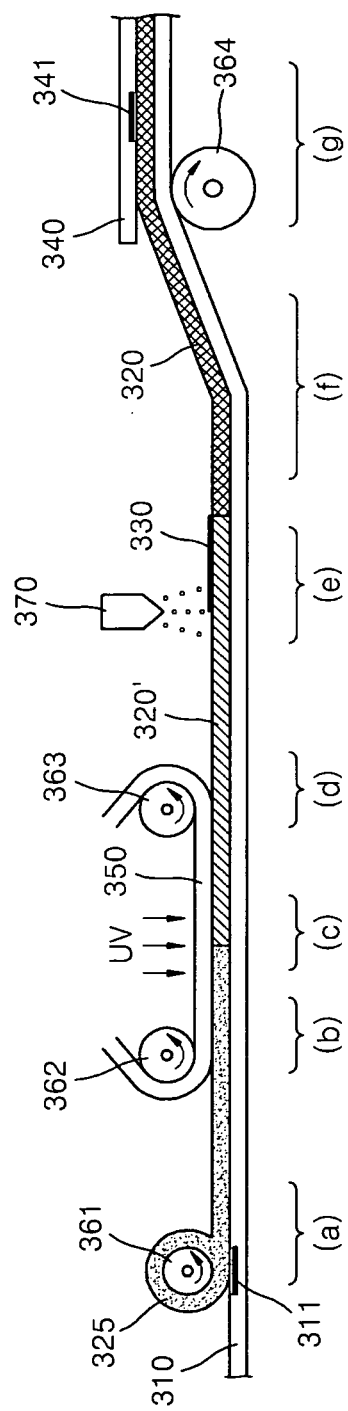
FIG. 13 is a view for explaining a method of forming a polymer-dispersed liquid crystal film including dichroic dye, according to example embodiments, in which the method includes a roll-to-roll process.

Hereinafter, a method of forming a PDLC film including dichroic dye by using a roll-to-roll process, according to example embodiments, will be described in detail. FIG. 13 is a view for explaining a method of forming a polymer-dispersed liquid crystal film including dichroic dye, according to example embodiments, in which the method includes a roll-to-roll process.

Referring to FIG. 13, a solution 325, including a liquid crystal and a photo-polymerizable material, is coated on a first substrate 310 that is moving, by using a first roller 361 (operation a). The first substrate 310 may be a transparent substrate, such as a glass substrate, or a flexible substrate, for example. Also, the first substrate 310 may further include a first component 311 selected from a TFT and a color filter. The first substrate 310 moves due to rotation of a fourth roller 364. The coating of the solution 325 may be performed by transferring the solution 325 coated on an outer surface of the first roller 361 onto an upper surface of the first substrate 310 due to rotation of the first roller 361. A third substrate 350 is attached to an upper surface of a layer of the solution 325 coated on the first substrate 310 by using a second roller 362 (operation b). The third substrate 350 wound on the outer surface of the second roller 362 is attached to the upper surface of the layer of the solution 325 due to rotation of the second roller 362. In this regard, the third substrate 350 may be a transparent, flexible substrate formed of a releasing material that enables the third substrate 350 to be easily separable.

UV rays are irradiated to the solution 325, including the liquid crystal and the photo-polymerizable material, through the third substrate 350 (operation c). Through the UV irradiation process, the photo-polymerizable material in the solution 325 is cured to form a polymer, thereby forming a PDLC layer 320', including the liquid crystal and the polymer, between the first substrate 310 and the third substrate 350. The third substrate 350 is separated from an upper surface of the PDLC layer 320' by using a third roller 363 (operation d). The third substrate 350 is separated from the upper surface of the PDLC layer 320' due to rotation of the third roller 363, thereby winding on an outer surface of the third roller 363.

A mixed solution 330, including a liquid crystal and dichroic dye, is coated on the upper surface of the PDLC layer 320' (operation e). The coating of the mixed solution 330 may be performed by, for example, spraying the mixed solution 330 on the upper surface of the PDLC layer 320' by using an inkjet ejecting device 370. However, the coating method is not limited thereto. For example, the coating of the mixed solution 330 may be performed by using various other coating methods, such as dipping or roll coating, for example.

A given time after the mixed solution 330, including the liquid crystal and dichroic dye, is coated on the upper surface of the PDLC layer 320', the liquid crystal and dichroic dye of the mixed solution 330 diffuse into the PDLC layer 320', thereby forming a PDLC layer 320 including dichroic dye (operation f). In the PDLC layer 320, the liquid crystal, dichroic dye, and the polymer are uniformly dispersed and due to the diffusion, the dichroic dye is present only in the liquid crystal. Also, if the first substrate 310 is heated in the diffusion process, the liquid crystal and dichroic dye may diffuse more rapidly.

Finally, a second substrate 340 is attached to an upper surface of the PDLC layer 320 including the dichroic dye, thereby completing the formation of a PDLC film (operation g). In this regard, the attachment of the second substrate 340 may be performed by, for example, lamination. Like the first substrate 310, the second substrate 340 may be a transparent substrate and may further include a second component 341 selected from a TFT and a color filter. As described above, according to example embodiments, a PDLC film, including dichroic dye, is more easily formed at a greater scale by using a roll-to-roll process.

Figure 14:
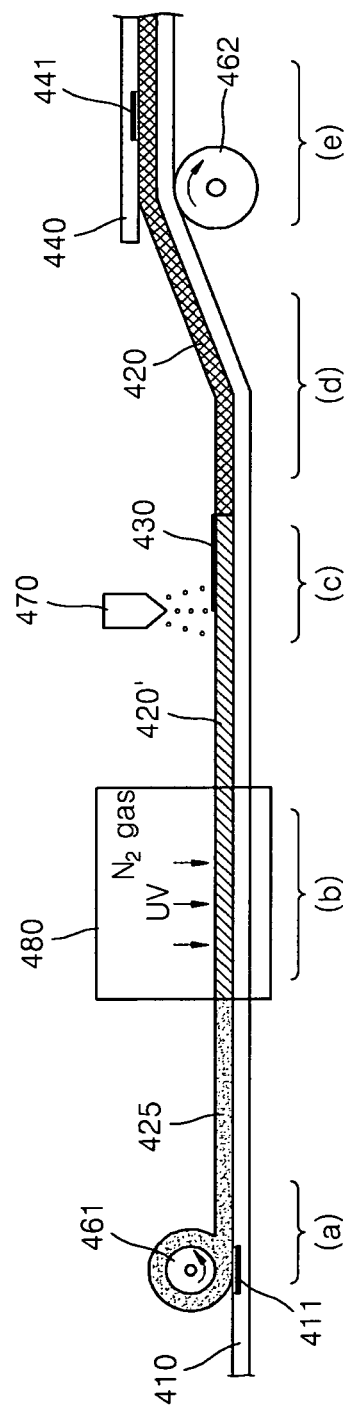
FIG. 14 is a view for explaining a method of forming a polymer-dispersed liquid crystal film including dichroic dye, according to example embodiments, in which the method includes a roll-to-roll process.

FIG. 14 is a view for explaining a method of forming a polymer-dispersed liquid crystal film including dichroic dye, according to example embodiments, in which the method includes a roll-to-roll process.

Referring to FIG. 14, a solution 425, including a liquid crystal and a photo-polymerizable material, is coated on a first substrate 410 that is moving by using a first roller 461 (operation a). The first substrate 410 may be a transparent substrate, such as a glass substrate, or a flexible substrate, for example. In addition, the first substrate 410 may further include a first component 411 selected from a TFT and a color filter. The first substrate 410 moves due to rotation of a second roller 462. The coating of the solution 425 may be performed by transferring the solution 425 coated on an outer surface of the first roller 461 onto an upper surface of the first substrate 410 due to rotation of the first roller 461. In a chamber 480 under an inert gas atmosphere, UV rays are irradiated to the solution 425 including the liquid crystal and the photo-polymerizable material (operation b). In this regard, the inert gas may be, for example, a nitrogen gas or a helium gas, but is not limited thereto. Through the UV irradiation process, the photo-polymerizable material in the solution 425 is cured to form a polymer, thereby forming a PDLC layer 420', including the liquid crystal and the polymer, on the upper surface of the first substrate 410.

A mixed solution 430, including a liquid crystal and dichroic dye, is coated on the upper surface of the PDLC layer 420' (operation c). The coating of the mixed solution 430 may be performed by, for example, spraying the mixed solution 430 on the upper surface of the PDLC layer 420' by using an inkjet ejecting device 470. However, the coating method is not limited thereto. For example, the coating of the mixed solution 430 may be performed by using various other coating methods, such as dipping or roll coating, for example. A given time after the mixed solution 430, including the liquid crystal and dichroic dye, is coated on the upper surface of the PDLC layer 420', the liquid crystal and dichroic dye of the mixed solution 430 diffuse into the PDLC layer 420', thereby forming a PDLC layer 420 including dichroic dye (operation d). In the PDLC layer 420, the liquid crystal, dichroic dye, and the polymer are uniformly dispersed and due to the diffusion, the dichroic dye is present only in the liquid crystal. Also, if the first substrate 410 is heated in the diffusion process, the liquid crystal and dichroic dye may diffuse more rapidly.

Finally, a second substrate 440 is attached to an upper surface of the PDLC layer 420 including the dichroic dye, thereby completing the formation of a PDLC film (operation e). In this regard, like the first substrate 410, the second substrate 440 may be a transparent substrate and may include a second component 441 selected from a TFT and a color filter. In example embodiments, attachment and separation of a third substrate (see 350 of FIG. 13) is not performed. Thus, a PDLC film including dichroic dye may be more easily formed.

As described above, according to example embodiments, the presence of dichroic dye in a polymer may be prevented or reduced by diffusing dichroic dye into a PDLC layer. By using the method, a PDLC display device with higher visibility may be embodied. In addition, a PDLC film including dichroic dye is formed by using a roll-to-roll process.

It should be understood that example embodiments described herein should be considered in a descriptive sense only and not for purposes of limitation. Descriptions of features or aspects within each example embodiment should typically be considered as available for other similar features or aspects in other example embodiments.

What is claimed is:

1. A method of forming a polymer-dispersed liquid crystal (PDLC) film, the method comprising:
    forming a PDLC layer on a first substrate, the PDLC layer including a liquid crystal and a polymer;
    coating a mixed solution on an upper surface of the PDLC layer, the mixed solution including a liquid crystal and dichroic dye;
    diffusing the liquid crystal and dichroic dye of the mixed solution into the PDLC layer such that the PDLC layer includes the dichroic dye; and
    attaching a second substrate to the upper surface of the PDLC layer including the dichroic dye.

2. The method of claim 1, wherein the forming the PDLC layer on the first substrate comprises:
    injecting a solution between the first substrate and a third substrate spaced apart from the first substrate, the solution including the liquid crystal and a photo-polymerizable material;
    irradiating ultraviolet (UV) rays to the solution; and
    separating the third substrate from an upper surface of the PDLC layer.

3. The method of claim 2, wherein the third substrate includes a releasing material that enables the third substrate to be separated from the PDLC layer.

4. The method of claim 1, wherein the forming the PDLC layer on the first substrate comprises:
    placing a solution on the first substrate, the solution including the liquid crystal and a photo-polymerizable material; and
    irradiating UV rays to the solution under an inert gas atmosphere to form the PDLC layer.

5. The method of claim 1, wherein the coating the mixed solution on the upper surface of the PDLC layer includes a process selected from the group consisting of spraying, dipping and roll coating processes.

6. The method of claim 1, wherein the diffusing the liquid crystal and dichroic dye of the mixed solution into the PDLC layer includes increasing the temperature of the first substrate.

7. The method of claim 1, wherein each of the first and second substrates includes at least one of a TFT and a color filter.

8. A method of forming a polymer-dispersed liquid crystal (PDLC) film, the method comprising:
    forming a PDLC layer on a first substrate, the PDLC layer including a liquid crystal and a polymer;
    coating a mixed solution on an upper surface of the PDLC layer, the mixed solution including a liquid crystal, a photo-polymerizable material, and dichroic dye;
    diffusing the liquid crystal, the photo-polymerizable material, and dichroic dye of the mixed solution into the PDLC layer such that the PDLC layer includes the dichroic dye; and
    attaching a second substrate to an upper surface of the PDLC layer including the dichroic dye and irradiating ultraviolet (UV) rays thereto.

9. The method of claim 8, wherein the forming the PDLC layer on the first substrate comprises:
    injecting a solution between the first substrate and a third substrate spaced apart from the first substrate, the solution including the liquid crystal and a photo-polymerizable material;
    irradiating UV rays to the solution; and
    separating the third substrate from the upper surface of the PDLC layer.

10. The method of claim 8, wherein the forming the PDLC layer on the first substrate comprises:
    placing a solution on the first substrate, the solution including the liquid crystal and a photo-polymerizable material; and
    irradiating UV rays to the solution under an inert gas atmosphere.

11. The method of claim 8, wherein the diffusing the liquid crystal, the photo-polymerizable material, and dichroic dye of the mixed solution into the PDLC layer includes increasing the temperature of the first substrate.

12. The method of claim 8, wherein each of the first and second substrates includes at least one of a TFT and a color filter.

13. A method of forming a polymer-dispersed liquid crystal (PDLC) film by using a roll-to-roll process, the method comprising:
    coating a solution on a first substrate using a first roller, the solution including a liquid crystal and a photo-polymerizable material;
    placing a third substrate on an upper surface of the solution using a second roller;
    irradiating UV rays to the solution to form a PDLC layer, the PDLC layer including the liquid crystal and a polymer;
    separating the third substrate from an upper surface of the PDLC layer using a third roller;
    coating a mixed solution on the upper surface of the PDLC layer, the mixed solution including a liquid crystal and dichroic dye;
    diffusing the liquid crystal and the dichroic dye of the mixed solution into the PDLC layer such that the PDLC layer includes the dichroic dye; and
    attaching a second substrate to the upper surface of the PDLC layer including the dichroic dye.

14. The method of claim 13, wherein the third substrate includes a releasing material that enables the third substrate to be separated from the PDLC layer.

15. The method of claim 13, wherein the coating the mixed solution on the upper surface of the PDLC layer includes a process selected from the group consisting of spraying, dipping and roll coating processes.

16. The method of claim 13, wherein the diffusing the liquid crystal and dichroic dye of the mixed solution into the PDLC layer includes increasing the temperature of the first substrate.

17. The method of claim 13, wherein each of the first and second substrates includes at least one of a TFT and a color filter.

18. A method of forming a polymer-dispersed liquid crystal (PDLC) film by using a roll-to-roll process, the method comprising:
    coating a solution on a first substrate using a roller, the solution including a liquid crystal and a photo-polymerizable material;
    forming a PDLC layer by irradiating ultraviolet (UV) rays to the solution under an inert gas atmosphere, the PDLC layer including liquid crystal and a polymer;
    placing a mixed solution on an upper surface of the PDLC layer, the mixed solution including a liquid crystal and dichroic dye;
    diffusing the liquid crystal and the dichroic dye of the mixed solution into the PDLC layer such that the PDLC layer includes the dichroic dye; and
    attaching a second substrate to the upper surface of the PDLC layer including the dichroic dye.

19. The method of claim 18, wherein the inert gas is at least one of a nitrogen gas and a helium gas.

20. The method of claim 18, wherein the diffusing the liquid crystal and dichroic dye of the mixed solution into the PDLC layer includes increasing the temperature of the first substrate.

\* \* \* \* \*